US012665101B2

(12) United States Patent
Cooper-Roy et al.

(10) Patent No.: US 12,665,101 B2
(45) Date of Patent: Jun. 23, 2026

(54) METHOD OF RECONFIGURING PARTICLES IN A GRID OF PARTICLE TRAPS

(71) Applicant: UPSCALE QUANTUM SOLUTIONS INC., Waterloo (CA)

(72) Inventors: Alexandre Cooper-Roy, Waterloo (CA); Amer E. Mouawad, Beirut (LB); Remy El Sabeh, Beirut (LB); Barry Cimring, Waterloo (CA); Marc Bacvanski, Boston, MA (US)

(73) Assignee: UPSCALE QUANTUM SOLUTIONS INC.

( * ) Notice: Subject to any disclaimer, the term of this patent is extended or adjusted under 35 U.S.C. 154(b) by 400 days.

(21) Appl. No.: 18/527,878

(22) Filed: Dec. 4, 2023

(65) Prior Publication Data

US 2024/0186029 A1 Jun. 6, 2024

Related U.S. Application Data

(60) Provisional application No. 63/430,115, filed on Dec. 5, 2022.

(51) Int. Cl.
*G21K 1/30* (2026.01)
*G06N 10/40* (2022.01)

(52) U.S. Cl.
CPC ............... *G21K 1/30* (2026.01); *G06N 10/40* (2022.01)

(58) Field of Classification Search
CPC ........ G06N 10/00; G06N 10/20; G06N 10/40; G21K 1/30
See application file for complete search history.

(56) References Cited

U.S. PATENT DOCUMENTS

| | | | | |
|---|---|---|---|---|
| 12,462,946 B2 * | 11/2025 | Kim | ......................... | G21K 1/30 |
| 2021/0375499 A1 * | 12/2021 | Marchand | .............. | G06N 10/40 |
| 2023/0411035 A1 * | 12/2023 | Schymik | ............... | G06N 10/40 |
| 2024/0249173 A1 * | 7/2024 | Norcia | ...................... | G04F 5/14 |
| 2024/0355496 A1 * | 10/2024 | Mcdonald | ................. | G02F 1/33 |

FOREIGN PATENT DOCUMENTS

| | | | | |
|---|---|---|---|---|
| EP | 4567686 A1 * | 6/2025 | ............. | G06N 10/40 |

* cited by examiner

*Primary Examiner* — David E Smith
(74) *Attorney, Agent, or Firm* — Norton Rose Fulbright Canada LLP; Alexandre Daoust

(57) ABSTRACT

The specification describes a method of reconfiguring particles in a grid of particle traps from an initial configuration to a target configuration, the grid of particle traps having target particle traps and surplus particle traps, the particles being movable along rows of the grid, or along columns of the grid, the rows being transversal to the columns.

20 Claims, 7 Drawing Sheets

Solve distant pairs of donor-receiver columns

Reach target configuration

Donor          Receiver

METHOD OF RECONFIGURING PARTICLES IN A GRID OF PARTICLE TRAPS

BACKGROUND

Programmable arrays of optical traps have recently emerged as an effective tool to assemble configurations of particles (e.g., single atoms and molecules) with arbitrary spatial geometries. Supplemented with strong, tunable interactions like Rydberg-Rydberg interactions, these configurations realize large, coherent quantum many-body systems that act as versatile testbeds for quantum science and technology.

An example of such a system is schematically presented in FIG. 1. In practice, the trap array is typically coupled to hardware elements which will be referred to herein as a controller for simplicity. The hardware elements of the controller can be categorized in two sub-groups which may or may not be mutually exclusive depending on the embodiment: a measurement system and an actuator system. The actuator system can perform functions such as initializing the trap array with an initial configuration of particles. In the initial configuration, particles may be randomly interspersed with particle-less traps in the trap array. The measurement system can be used to measure the presence or absence of particles at each trap in the trap array, and therefore to provide information as to what the initial configuration is in a particular instance. Some form or another of a computer can then be used, in association with software functions, to determine a sequence of "moves" or displacement trajectories for one or more of the particles, which is deemed to, upon execution, allow to change the initial configuration to a target configuration. The target configuration can be one where the experiments can be performed. Depending on the embodiment, this "computer" can be part of the controller, be connected to the controller in a wired manner, or be connected to the controller in a wireless manner, either directly, or indirectly (e.g. via a local network or a telecommunications network such as the Internet). Such challenges may be addressed by the engineering of processing technologies used to solve "reconfiguration" problems. Reconfiguration problems are known to be hard combinatorial optimization problems that seek a sequence of control operations to prepare a given configuration of particles from an arbitrary one.

From the point of view of the computer executing the software functions which solve the reconfiguration problem, the nature of the particles can be abstracted and represented by indistinguishable tokens. Similarly, the nature of the particle traps, and the paths along which particles can be displaced from one particle trap to another can be abstracted and represented by a graph having a plurality of locations indistinguishable except for the manner in which they are interconnected to the other locations of the graph. A solution to the reconfiguration problem can thus be provided in the form of an abstract collection of data referred to as a path system, including a set or collection of paths.

The actuator system can further perform functions such as executing the sequence of displacement trajectories, based on the path system, thereby moving individual particles or groups of particles from their initial locations in the traps to locations associated with the target configuration. The measurement system can then also be used to determine whether the overall displacement operation, or individual steps of the operation, is a success or a failure. Indeed, in the case of optical traps and with the technology available at the time of filing this specification, a non-negligible probability of particle loss was present. The probability of particle loss could be associated to any displacement operation on the particles, and could also be a function of time elapsed between the initial configuration and the target configuration, imposing particular challenges on the efficiency of processes executed by the computer to determine the sequence of displacement trajectories.

The difficulties associated with providing software technologies which can address reconfiguration problems scale significantly with the amount of possible combinations (e.g., the number of traps and/or of particles). In the absence of atom loss, finding a control protocol that exactly minimizes the total number of displacement operations, without concern for any other performance metrics, can be done in polynomial time using assignment processes, such as those based on the Hungarian process, whereas finding a control protocol that minimizes the total number of displaced atoms is an NP-complete problem (even on very simple geometries, such as grids), which can be approximately solved in polynomial time using the Steiner tree 3-approximation process (3-approx). While such processing technologies were satisfactory to a certain degree, there remains room for improvement. In particular, there remained unaddressed technological problems associated with improving success probability and/or improving processing speed, especially when factoring in elements such as probability of loss.

SUMMARY

In accordance with one aspect, there is provided a method of reconfiguring particles in a grid of particle traps from an initial configuration to a target configuration, the grid of particle traps having target particle traps and surplus particle traps, the particles being movable along rows of the grid, or along columns of the grid, the rows being transversal to the columns, the method comprising: loading an initial configuration of the particles into the particle traps, wherein in said initial configuration, the particles are distributed amongst some of the particle traps; measuring the initial configuration, including measuring an absence or presence of the particles in corresponding ones of the particle traps, the initial configuration including a donor column having more particles than target particle traps, and a receiver column having less particles than target particle traps, the donor column being separated from the receiver column by at least one intervening column; at the donor column, filling all of the target particle traps including moving some of the particles from the surplus particle traps to the target particle traps, with a surplus particle remaining in the surplus particle traps subsequently to said moving; moving said surplus particle to the receiver column along a corresponding one of said rows via the at least one intervening column; and at the receiver column, filling all of the target particle traps including moving some of the particles, including said at least one surplus particle, from the surplus particle traps to the target particle traps.

Many further features and combinations thereof concerning the present improvements will appear to those skilled in the art following a reading of the instant disclosure.

DESCRIPTION OF THE FIGURES

In the figures.

Figure 3A:
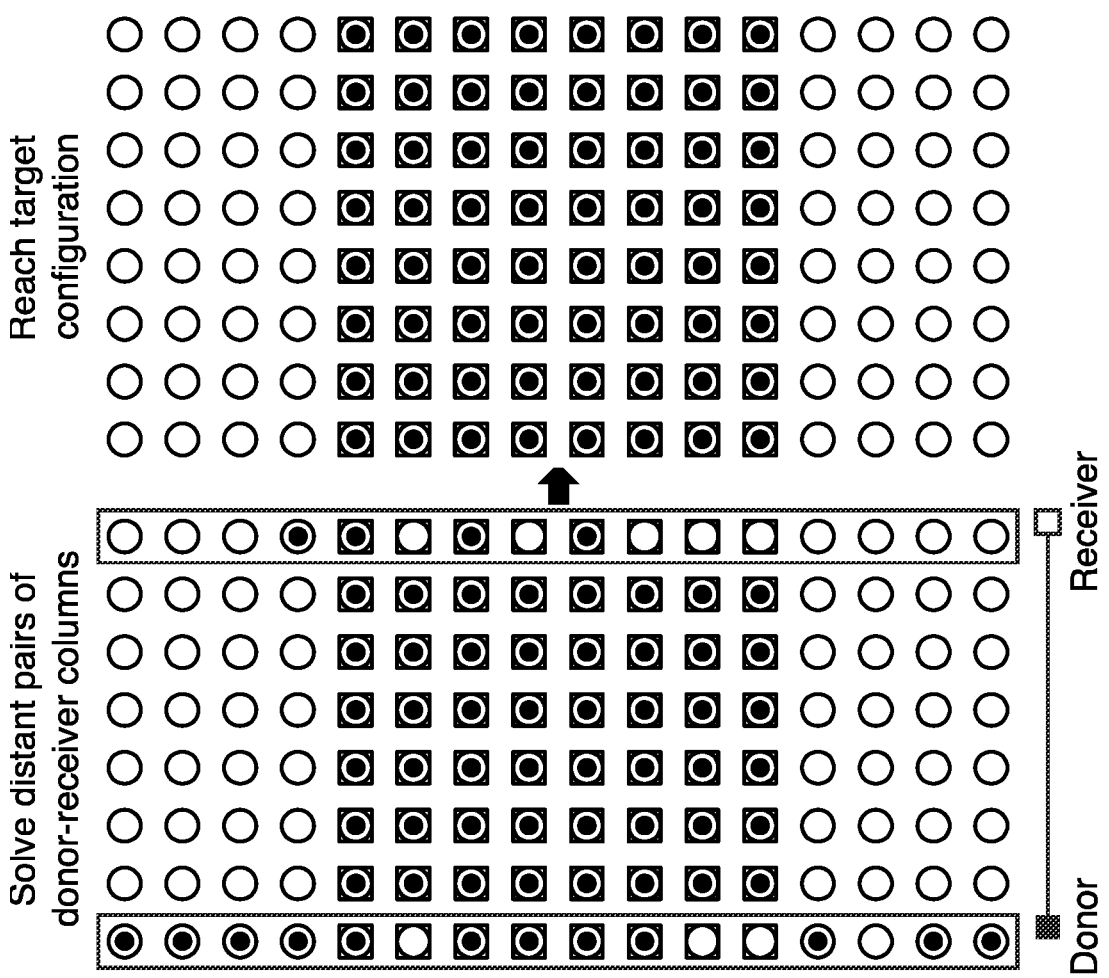
FIGS. 3A, 3B and 3C represent examples associated to the reconfiguration of particles in particle traps, more specifically sequences of control operations to prepare a target configuration of $$N_a^T = 8 \times 8$$
Figure 3B:
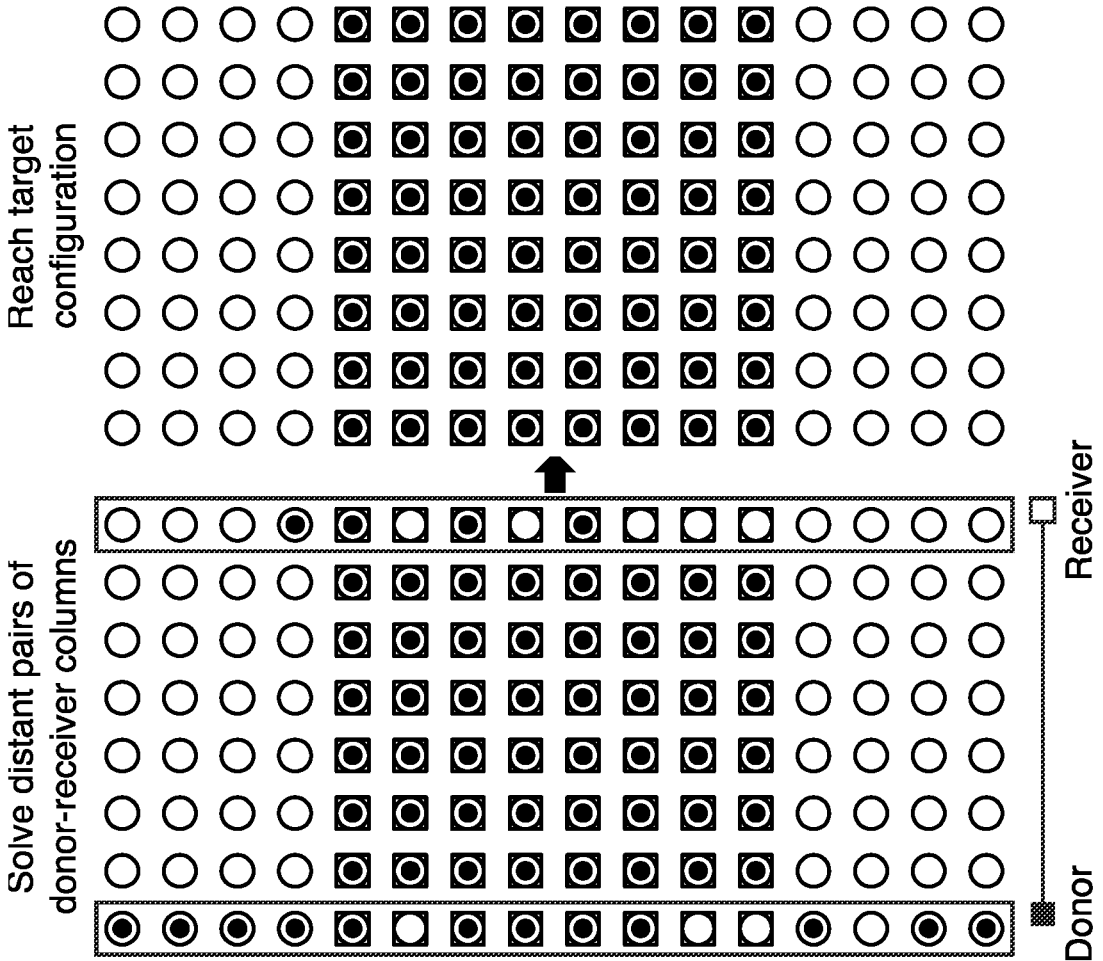
Figure 3C:
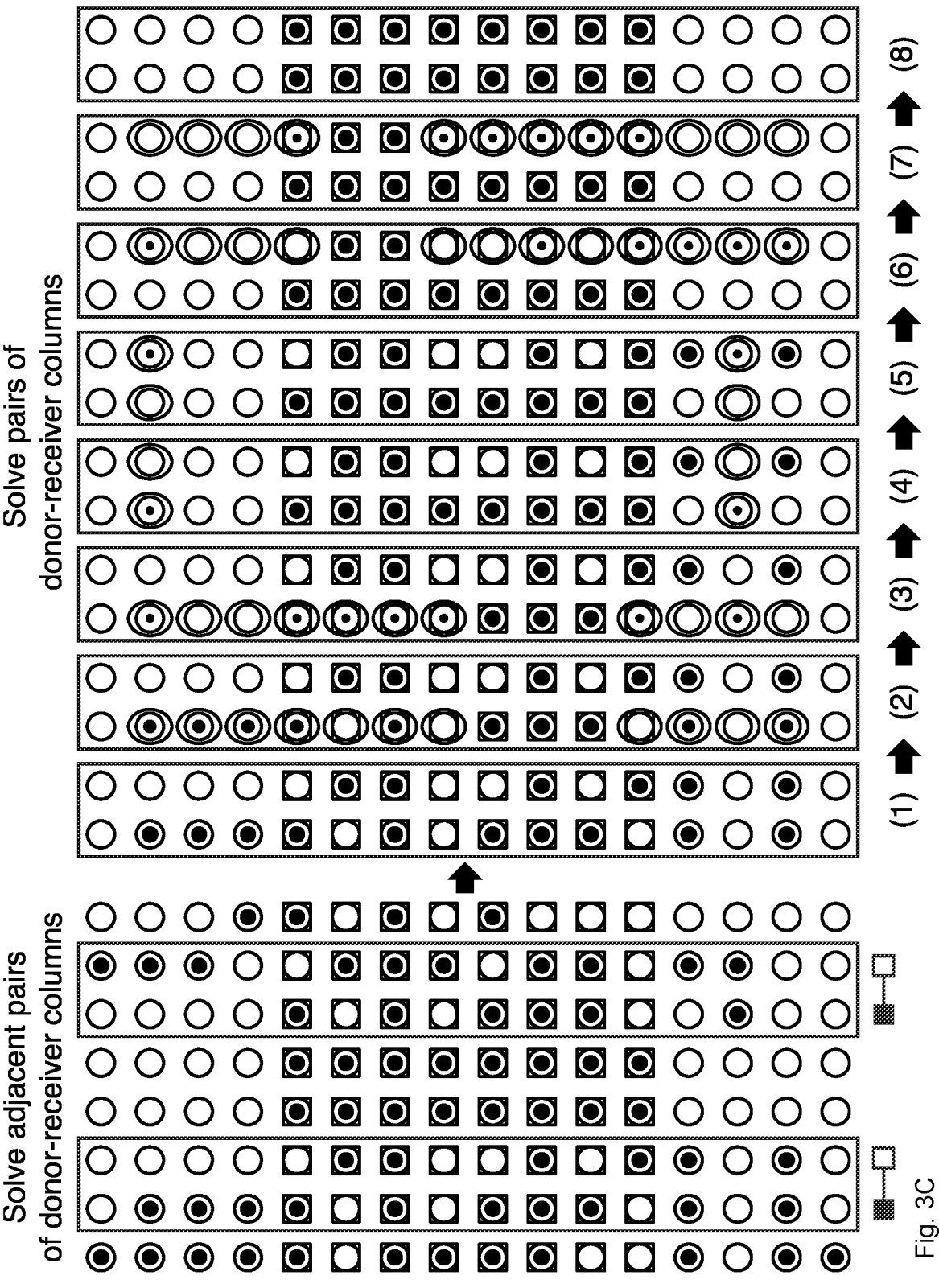
Figure 4:
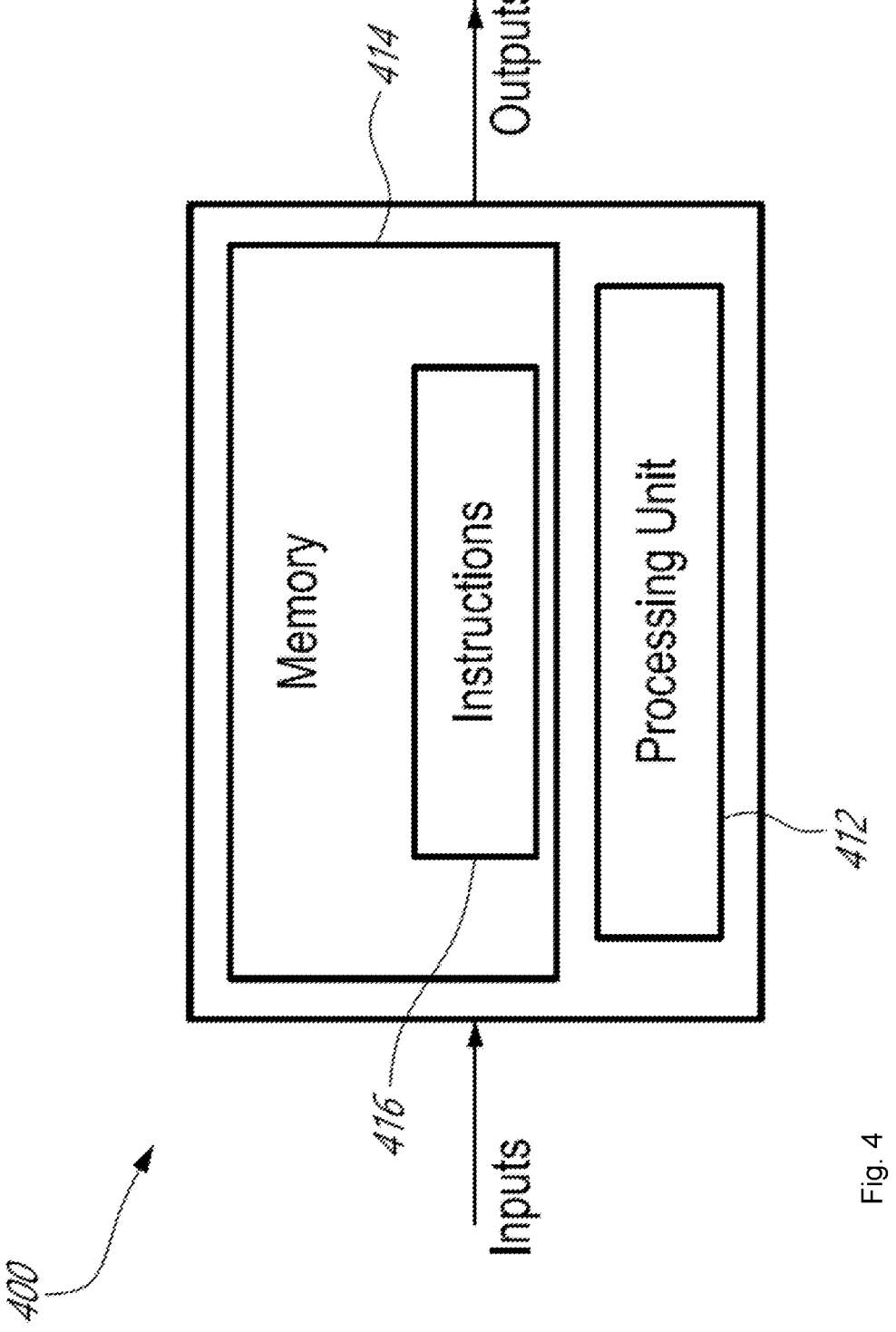

atoms (green shaded disks) in a static trap array of $N_t = 8 \times 16 = 128$ traps (black circles) from an arbitrary configuration of $$N_a^0 = 64$$

atoms (black dots). After computing the imbalance of each column as the difference between the number of detected and desired atoms, the process sequentially reconfigures individual neutral columns, neighboring pairs of donor-receiver columns, and then distant pairs of donor-receiver columns. FIG. 3B represents an individual neutral column being solved by extracting atoms from the static trap array into the dynamic trap array (orange squares), displacing the atoms to the desired target locations, and implanting the atoms back into the static trap array. FIG. 3C represents a pair of donor-receiver columns being reconfigured using a streamlined sequence of control operations that ((1)-(3)) reconfigures the donor column while displacing atoms to be exchanged to open rows, ((4)-(5)) redistributes surplus atoms from the donor column to the receiver column in a single parallel displacement step, and ((6)-(8)) reconfigures the receiver column. The problem of solving a distant pair of donor-receiver columns (FIG. 3A) can be reduced to the problem of solving an adjacent pair of dono-receiver columns (FIG. 3C);

FIG. 4 is a schematic representation of a computer; and

Figure 5:
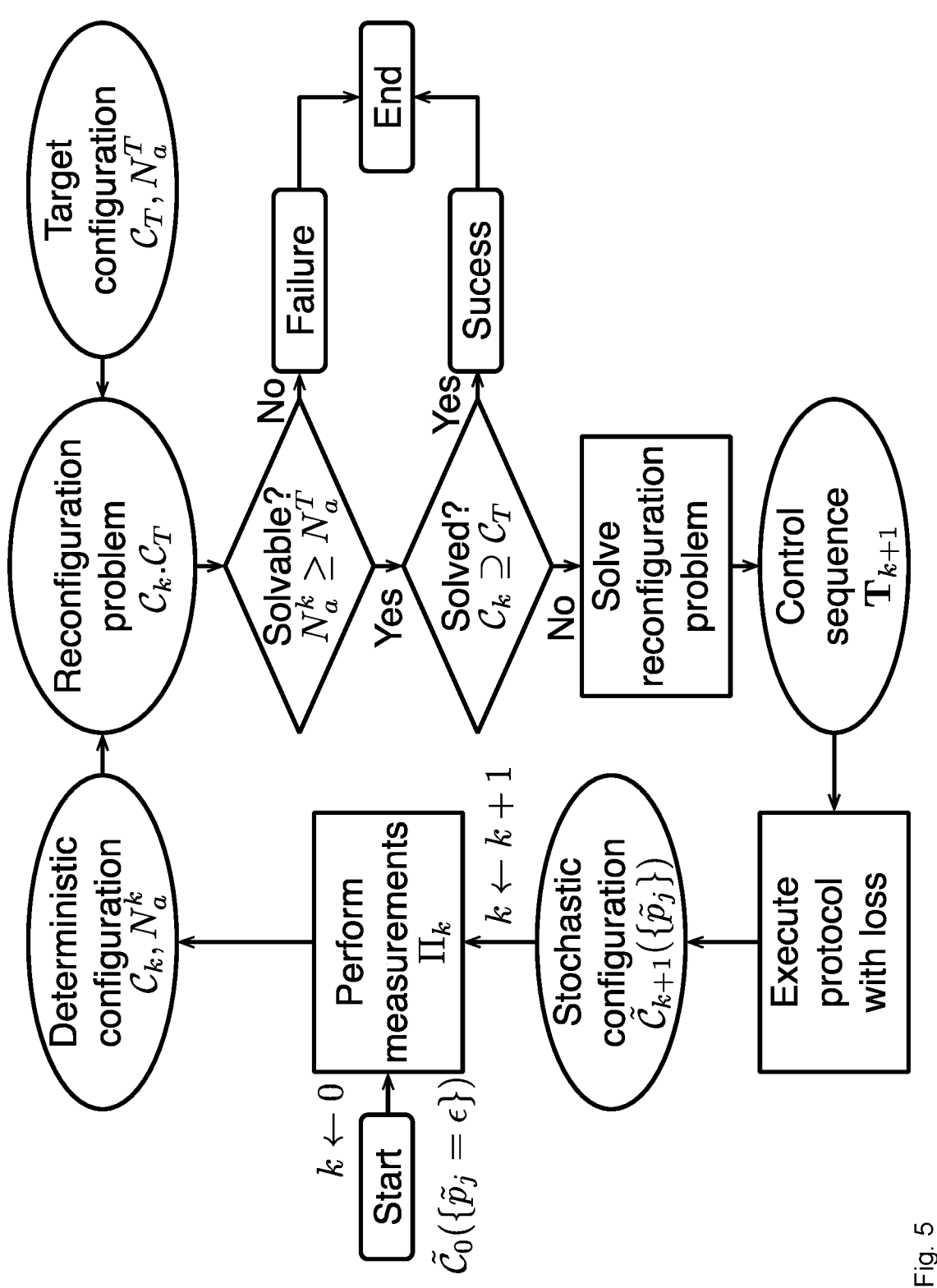

FIG. 5 is a flowchart of a typical reconfiguration protocol.

DETAILED DESCRIPTION

It was found that in at least some embodiments, one or more inconveniences of previous reconfiguration processes could be alleviated using a different process. More specifically, it was found that such a different process could be useful to address situations where particles are initially distributed amongst both target particle traps and surplus particle traps of a grid of particle traps. The grid of particle traps has two transversal dimensions which will be labeled rows and columns here for convenience, the particles being movable along either said rows or said columns. Such a process can be useful in embodiments where the particles have a probability of loss, either during their movement, during idle time associated to the movement of other ones of the particles, or both.

Figure 1:
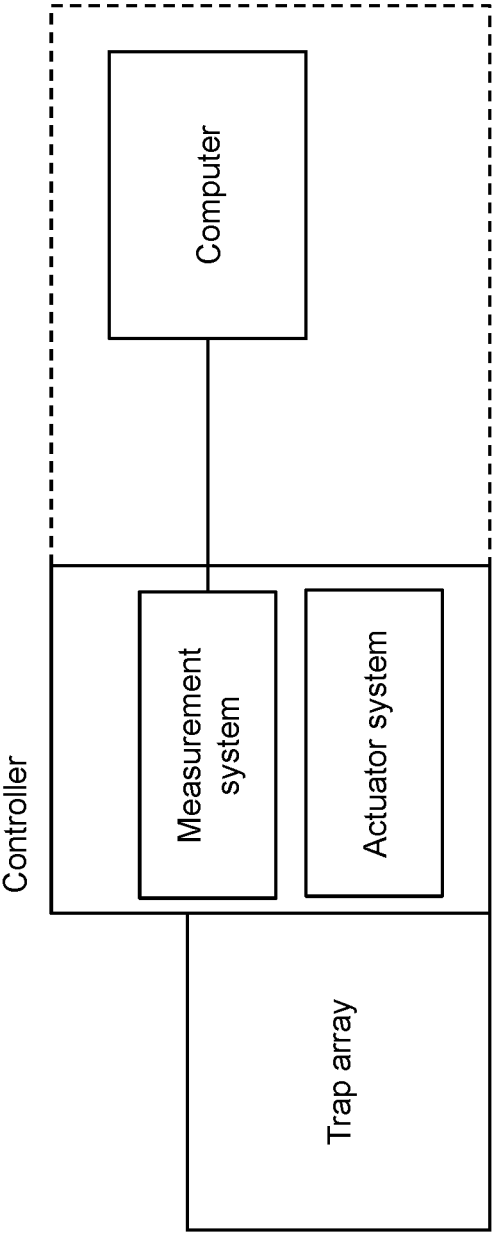
FIG. 1 is a view of an example of a system for reconfiguring particles in a trap array.
Figure 2:
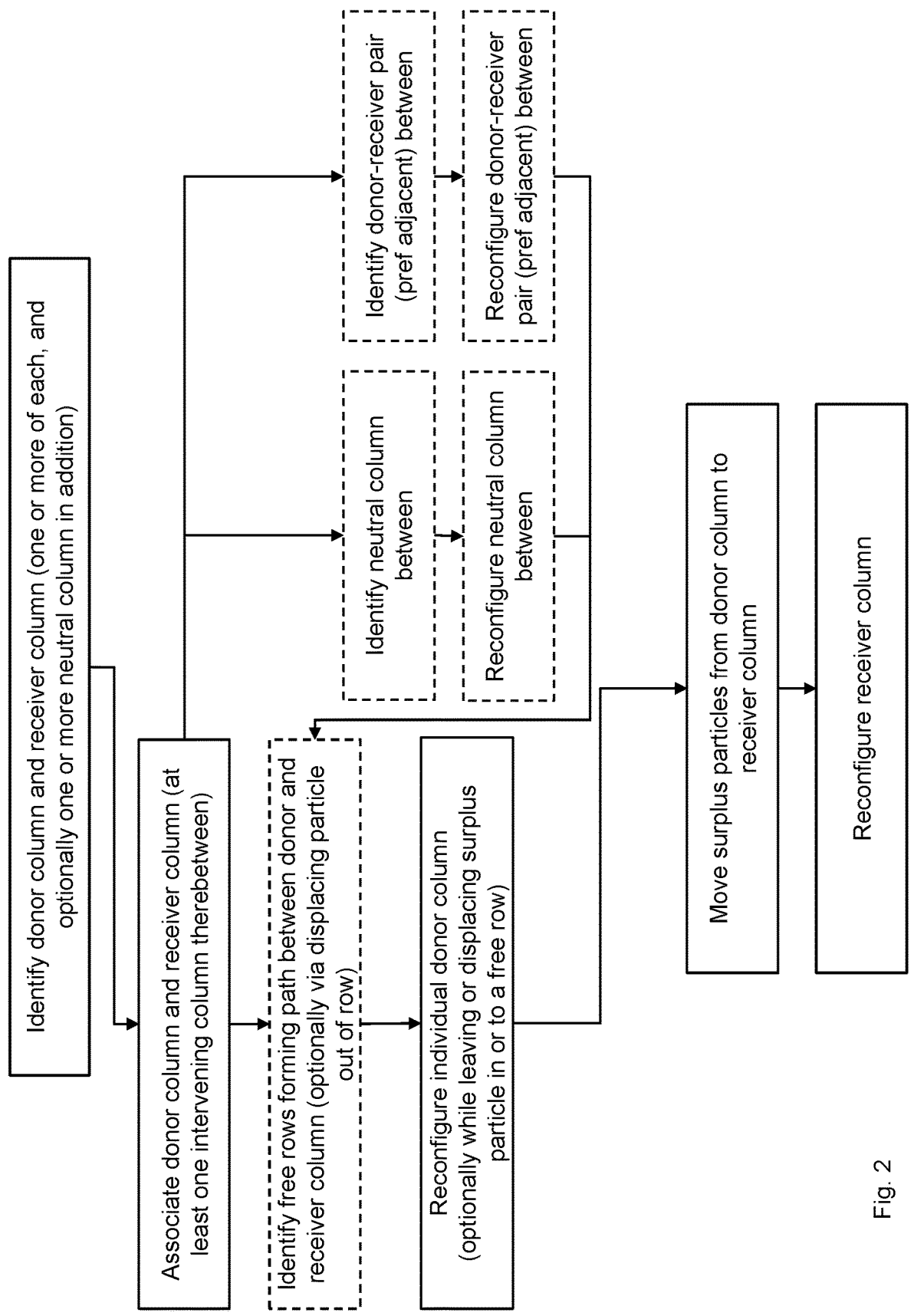
FIG. 2 is a flow-chart representing a method of reconfiguring particles in a grid of particle traps.

FIG. 2 presents an example of such a process. Typically, upstream of the method, an initial loading step is performed via which particles randomly populate both the target particle traps and the surplus particle traps. A measurement is performed to determine the initial configuration, i.e. which ones of the particle traps are populated by particles and which ones are not populated (i.e. particles are absent). A computer-implemented process can be performed to establish a sequence of moves which will lead to filling the target particle traps including moving particles from the surplus particle traps to the target particle traps. The computer implemented process will count a number of particles in each column and compare the number of particles to the number of target particle traps. Columns having more particles than target particle traps can be referred to as donor columns, columns having less particles than target particle traps can be referred to as receiver columns, and columns having as many particles as target particle traps, if any, can be referred to as receiver columns. Donor columns can be paired with receiver columns.

The method can include reconfiguring individual donor columns, including filling all their target particle traps with particles already present in the donor column. This process can involve moving one or more particle from surplus particle traps of the column to target particle traps of the column. This will leave one or more surplus particle in the surplus particle traps. These surplus particle(s) can then be moved to the paired receiver column along (a) corresponding row(s). Then, the receiver column, now having enough particles, is reconfigured, including filling all the target particle traps with particles now present in the receiver column.

The process can be particularly useful to address scenarios where donor columns are separated from the receiver column they are paired with by at least one column which can be referred to as an intervening column. The pairing can be executed by the computer in a manner for such intervening columns to potentially include one or more neutral column, one or more donor column, and/or one or more additional pair of donor-receiver columns.

When a neutral column is at an intervening column, the neutral column can be reconfigured (e.g. by filling all the target particle traps with particles already present in the donor column) before moving surplus particles from the donor column to the receiver column. This can allow to free all the surplus particle traps of the neutral column, and contribute to open unencumbered paths along rows between the donor column and the receiver column.

When an additional pair of donor-receiver columns is present between the paired donor column and receiver column, it can be preferable to reconfigure such pairs of donor-receiver columns prior to proceeding with the reconfiguration of the distant pair of donor column and receiver column. This can allow to free some or all the surplus particle traps of the additional donor-receiver column pair, and contribute to open unencumbered paths along rows between the donor column and the receiver column.

In particular, it can in some embodiments be preferable to reconfigure any neutral column, or any adjacent donor-receiver pair having matching numbers of surplus particles and particle deficits, before proceeding with any further step such as reconfiguring distant pairs of donor-receiver columns. Reconfiguring neutral columns and reconfiguring adjacent donor-receiver pairs can be considered equivalent from a priority of operation perspective, and can be performed equivalently in any order.

In the event where one or more particle remains in surplus particle traps of intervening columns, the step of reconfiguring the donor column can include moving the one or more surplus particle to (a) corresponding row(s) which have previously been determined by the computer-implemented process to be free of particles in the intervening column(s), and thus unobstructed, prior to moving the surplus particles from the donor column to the receiver column along that or those row(s).

The steps of reconfiguring neutral columns, and/or reconfiguring pairs of donor-receiver columns which either have the same number of surplus particles and particle deficits or a greater number of surplus particles than particle deficits, on adjacent and/or distant pairs, can be repeated multiple times, until all target particle traps are filled and a target configuration is reached. Indeed, the possibilities can scale exponentially based on the number of particle traps and the process can be particularly useful on grids of particle traps having more than 50, more than 100, more than 200 or more than 500 traps, for instance. The ratio between the number of surplus particle traps and the number of target particle traps can vary based on the number of particle traps of the grid and on the probability of loss, for instance.

Once the target configuration has been reached, it can be relevant to measure the target configuration to ensure that particles indeed populate each and every one of the target particle traps and have not become lost during the reconfiguration process. If the measurement determines that the target configuration is correct, one can move onto the use of the target configuration, which can involve performing experiments on the particles in the target configuration for instance. If the measurement determines that the target configuration is incorrect, it can be preferable in some embodiments to begin anew with the loading and reconfiguration process, to avoid wasting time.

In some embodiment, it can be further be useful for the computer-implemented process to compare the number of particles stemming from the loading step with a threshold, since the process of populating particle traps can have some probability of leading to an absence of particle at the particle trap and a probability of leading to a presence of a particle at the particle trap. If overall, the number of particles is below the number of target particle traps, for instance, it can be relevant to begin anew with the loading step rather than losing time with a reconfiguration process which is deemed likely, or certain, to fail. In some cases, it can be advantageous to set the threshold above the number of target particle traps.

For the sake of providing a clear and detailed description, an example embodiment will now be detailed. This example embodiment can be referred to as the redistribution-reconfiguration (red-rec) process. The red-rec process solves atom reconfiguration problems on grids by breaking them down into a sequence of simpler reconfiguration problems on individual columns and pairs of columns. For instance, in some cases, by beginning by redistributing matching adjacent donor-receiver pairs and/or neutral columns, the redistribution of distant donor-receiver pairs (e.g. FIG. 3A) can be reduced to a problem of redistributing adjacent donor-receiver pairs (e.g FIG. 3C).

First, following each measurement, the process computes the imbalance of atoms within each column of the trap array as the difference between the number of measured atoms and the number of desired atoms. Columns are thus classified as donor (positive imbalance), receiver (negative imbalance), or neutral (zero imbalance).

Second, the process reconfigures individual neutral columns using an exact reconfiguration process on 1D chains, which identifies the subset of atoms whose reconfiguration minimizes the total number of displacement operations in a single extraction-displacement-implantation (EDI) cycle (such as the one shown in FIG. 3B). Because the column is neutral, the reconfiguration problem is trivially solved by assigning surplus atoms to empty traps from the outside to the inside of the trap array.

Third, the process reconfigures pairs of donor-receiver columns starting with adjacent pairs that can fully satisfy one another, followed by adjacent and distant pairs that can exchange the most atoms in a single redistribution sequence.

The pairs of donor-receiver columns are solved using a streamlined sequence of operations, which redistributes atoms from donor columns to receiver columns (FIG. 3C). The atoms within the donor column are labeled according to three categories: reconfigured atoms, which are to populate the target region of the donor column, redistributed atoms, which are to populate the target region of the receiver column, and idle atoms, which are to remain idle within the donor column (we have numerically confirmed that placing idle atoms near the target region to facilitate replacing lost atoms in subsequent reconfiguration cycles is detrimental, resulting in a 1-2% reduction in the mean success probability). Reconfigured atoms are chosen among the atoms located in both external and target regions to populate the target region with the smallest number of displacement operations. Redistributed atoms are chosen exclusively among the atoms located in the external region, starting from the ones located the farthest away from the target region, favoring the choice of an equal numbers of atoms above and below the target region.

The redistributed atoms are assigned to the nearest open rows along which they can be displaced from the donor column to the receiver column without obstructions, prioritizing rows closer to the target region. This assignment is done greedily by going over each redistributed atom one by one and, for each one of them, choosing the closest open row or the one closer to the target region if there are two closest rows. The redistributed atoms transferred to the receiver column are reconfigured by solving the exact 1D reconfiguration process. We restrict redistribution along rows in the external regions to avoid increasing the corruption of atoms in the centre of the target region. To decrease the total number of displacement operations, at the cost of increasing the computational time, the labeling of redistributed atoms and their assignment to distribution rows could be achieved by exhaustively searching over all possibilities.

The streamlined sequence of operations is used to reconfigure the donor column while bringing the redistributed atoms to open rows, distribute redistributed atoms from the donor to the receiver column in parallel, and reconfigure the receiver column (FIG. 3C). The streamlined sequence of operations only extracts and implants the redistributed atoms once, thus reducing the number of transfer operations. If not all redistributed atoms can be redistributed in a single step, e.g., because the number of open rows is less than the number of atoms to be redistributed, then the streamlined sequence of operations is repeated until the receiver column reaches zero imbalance. If the receiver column has not been fully satisfied by the donor column, then then it is paired with another donor column. If there are no open rows along which to distribute atoms between any of the donor and receiver columns, where an open row is a row that has no obstructing atoms on the trajectory between the donor column and the receiver column, the process reconfigures all the individual columns and restarts the pairing.

Fourth, a measurement is performed to uncover the configuration of atoms in the static trap array. The measurement-reconfiguration cycle is repeated until the reconfiguration problem succeeds or fails, i.e., the measured configuration contains the target configuration, or too few atoms remain to achieve the target configuration.

In this specification, when referring to an atom at $\vec{x} \in \mathbb{R}^3$ as $a(\vec{x}, \tilde{p})$, $\tilde{p} \in [0,1]$ is the probability of detecting the atom by performing a perfect measurement at $\vec{x}$. A perfect measurement at $\vec{x} \in \mathbb{R}^3$, $\pi(\vec{x})$, detects an atom at $\vec{x}$ if and

7

8 only if there is an atom at $\vec{x}$. If a perfect measurement detects an atom at $\vec{x}$, then the probability $\tilde{p}$ of $a(\vec{x}, \tilde{p})$ is updated from a probabilistic value $\tilde{p} \in [0,1]$ to a deterministic value $p \in \{0,1\}$. An atom $a(\vec{x}, p)$ with $p=0$ is said to have been lost and can be disregarded.

A configuration of atoms $$\tilde{C} = \{a_j(\vec{x}_j, \tilde{p}_j)\}_{j=1}^{N_a}$$

is defined as a collection of $N_a$ atoms that would each be detected by a collection of perfect measurements performed at the location of each atom, $$\Pi = \{\pi_j(\vec{x}_j)\}_{j=1}^{N_a}.$$

A deterministic configuration of atoms $C$ is a collection of atoms whose detection probability is unity, i.e., $p_j=1$ for all $1 \leq j \leq N_a$.

When referring to a trap at $\vec{x} \in \mathbb{R}^3$ as $t(\vec{x}, \tilde{p})$, $\tilde{p} \in [0,1]$ is the probability that the trap t contains an atom $a(\vec{x}, \tilde{p})$, which we set equal to the probability of detecting $a(\vec{x}, \tilde{p})$ at $\vec{x}$. Each trap is implicitly specified by its physical properties, which include its effective trap depth. We define a trap array $\mathcal{A}$ $$(V, S) = \{t(\vec{x}_j, \tilde{p}_j)\}_{j=1}^{N_t}$$

as a collection of $N_t=|V|$ traps, where $$V = \{\vec{x}_j\}_{j=1}^{N_t}$$

specifies the geometry of the trap array and $$S = \{\tilde{p}_j\}_{j=1}^{N_t}$$

specifies the occupation state of the trap array. The trap array $\mathcal{A}$ contains a configuration of atoms $$\tilde{C} = \{a(x_j, \tilde{p}_j) \mid x_j \in V(\mathcal{A}), \tilde{p}_j > 0\}_{j=1}^{N_t}$$

that can be mapped onto a deterministic configuration of atoms $C$ by performing a perfect measurement at the location of each trap of the trap array. We distinguish a dynamic trap array from a static trap array depending on whether the location and physical properties of the traps can change with time. The set of all dynamic traps is chosen to contain the static trap array so that an atom in a static trap can be displaced to any other static trap by controlling the dynamic trap array.

In this specification, trap arrays will be defined in the restricted plane $[0, L]^2 \subset \mathbb{R}^2$, the field of view, which effectively replaces $\mathbb{R}^3$ in the previous definitions, unless otherwise explicitly specified. Typical geometries in $\mathbb{R}^2$ include (a) *Bravais lattices* (oblique, rectangular, centered rectangular, square, and hexagonal), which are specified by their origin and generator vectors, (b) sub-lattices, which are specified by their origin, generator vectors of the parent lattice, and coordinate numbers (indicating which elements in the parent lattice are present), and (c) arbitrary geometries, which are specified by a list of spatial coordinates.

More specifically, we focus our attention on trap arrays with a grid geometry, effectively solving the problem of preparing a target configuration of $$N_a^T = \sqrt{N_a^T} \times \sqrt{N_a^T}$$

atoms forming a square-compact region in the center of a static trap array with a square-lattice geometry and rectangular dimensions containing $$N_t = N_t^x \times N_t^y$$

traps. We choose the number of traps to be $$N_t^x = \sqrt{N_a^T}$$

and $$N_t^y = \eta \sqrt{N_a^T},$$

so that $$N_t = \eta N_a^T,$$

where $$\eta = N_t / N_a^T$$

is the overhead factor quantifying the excess in optical traps needed to compensate for atom loss and imperfect loading efficiency. We refer to the internal region or target region of the trap array as the set of static traps containing the target configuration of atoms and the external region as the set of all remaining static traps. The red-rec process could be further extended to more general oblique lattices with rhomboidal boundaries, including triangular lattices with two generator vectors of equal norm oriented at a relative angle of $\pi/3$.

Reconfiguration Protocols

An atom reconfiguration problem seeks a sequence of control operations to prepare a predetermined target configuration of atoms from an arbitrary configuration of atoms. An atom reconfiguration problem is said to be solvable if the target configuration $C_T$ is reachable in a finite number of control steps, and efficiently solvable if it is solvable and the number of control steps in a solution is polynomial in the size of the static trap array. An optimal solution with respect to a given cost function is a solution that minimizes the cost function, such as the total number of displacement operations.

We refer to the solution of an atom reconfiguration problem as a control protocol $\mathcal{P} = (\Pi_0, T_1, \Pi_1, \ldots, T_K, \Pi_K)$, which is defined as an initial measurement $\Pi_0$ followed by sequence of K reconfiguration cycles, each cycle comprising a measurement step, $\Pi_k$, and an actuation step, $T_k$. The kth actuation step executes a sequence of elementary control operations, $T_k = (T_{k,1}, T_{k,2}, \ldots, T_{k,L_k})$, where $T_{k,l}$ is the lth elementary control operation of the kth reconfiguration cycle and $L_k$ is the number of elementary control operations required to execute the kth control sequence. The kth measurement step reveals the configuration of atoms contained in the trap array, effectively projecting into a deterministic state $\mathcal{C}_k$ of $$N_a^k$$

atoms. If the number of detected atoms is less than the number of desired atoms, $$N_a^k < N_a^T,$$

then the reconfiguration problem is said to be unsolvable, the protocol is said to have failed, and the execution of the protocol is aborted. On the other hand, if the number of detected atoms is greater than or equal to the number of desired atoms, $$N_a^k \geq N_a^T,$$

then the reconfiguration problem is said to be solvable and the execution of the protocol continues. If the measured configuration contains the target configuration, $\mathcal{C}_k \supseteq \mathcal{C}_T$, then the problem is said to have been solved in K=k reconfiguration cycles, the protocol is said to have succeeded, and the execution of the protocol is terminated. The reconfiguration protocol is thus executed until the target configuration has been reached or is no longer reachable because the number of remaining atoms is no longer sufficient. The number of reconfiguration cycles required to successfully prepare the target configuration of atoms thus depends on the initial configuration of atoms, as well as the realization of loss processes associated with control errors.

Each elementary control operation $T_{k,l}$ is chosen from a set of six elementary control operations, $$\{T_{\alpha,v}^{\pm,0}\},$$

defined as transfer operations, $$T_\alpha^\pm,$$

which include extraction operations, $$T_\alpha^+,$$

and implantation operations, $$T_\alpha^-,$$

that transfer atoms from and to the static trap array to and from the dynamic trap array; displacement operations, $$T_{vj}^\pm,$$

that displace a dynamic trap by an elementary step along the generator vector $\vec{k}_j$ of the static trap array, either forward, $$T_{vj}^+,$$

or backward, $$T_{vj}^-;$$

and no-op operations, $$\{T_\alpha^0, T_v^0\},$$

that leave some traps undisturbed while transfer and displacement operations are performed on other traps. Explicitly defining no-op operations facilitates accounting for the loss of idle atoms in both static and dynamic traps. Given that they satisfy hardware constraints, the control operations acting on different individual traps can be executed in parallel by batching them into a sequence of control operations acting on multiple traps simultaneously.

The configuration of atoms contained in the static trap array is typically updated by extracting it from a static trap into a dynamic trap (extraction), displacing it by elementary steps to its target location (displacement), and implanting it back into a static trap (implantation); we refer to this sequence of operations as an extraction-displacement-implantation (EDI) cycle. Multiple dynamic traps can be actuated simultaneously, given that they satisfy specific operational constraints. In the present study, we restrict our analysis to dynamic trap arrays that form horizontal or vertical chains along rows or columns of a grid.

Control Operations

Control operations might update both the state and the geometry of the static trap array, $A_s(V_s, S_s)$, and the dynamic trap array, $A_d(V_d, S_d)$. Transfer operations $$T_\alpha^\pm(\vec{x}_l)$$

update the state of the traps at $\vec{x}_I$ in both the static and dynamic trap arrays. Given a static trap $t_s(\vec{x}, \tilde{p})$ at $\vec{x} = \vec{x}_I$ containing an atom with probability $\tilde{p}$ and an overlaid dynamic trap $t_d(\vec{x}, 0)$ at $\vec{x}$ containing no atom, an extraction operation transfers an atom from the static trap to a dynamic trap, updating the static and dynamic traps from $t_s(\vec{x}, \tilde{p})$ and $t_d(\vec{x}, 0)$ to $t_s(\vec{x}, 0)$ and $t_d(\vec{x}, \tilde{p})$, respectively. Similarly, an implantation operation transfers an atom from a dynamic trap to a static trap, updating the static and dynamic traps from $t_s(\vec{x}, 0)$ and $t_d(\vec{x}, \tilde{p})$ to $t_s(\vec{x}, \tilde{p})$ and $t_d(\vec{x}, 0)$, respectively. A transfer operation acting on a pair of empty traps returns empty traps (no atom can be created spontaneously), whereas a transfer operation acting on a pair of occupied traps returns a pair of empty traps. These definitions assume that the static and dynamic traps are overlaid; otherwise, implanting an atom in free space leads to its loss. Similarly, elementary displacement operations $$T_{vj}^{\pm}$$

acting on the dynamic trap $t_d(\vec{x}, \tilde{p})$ at $\vec{x}$ will displace the trap and the atom it contains from $\vec{x}$ to $\vec{x} \pm \vec{k}_j$, where $k_j$ is the generator vector of the static trap array, e.g., $\vec{k}_j \in \{\vec{k}_x, \vec{k}_y\}$ on the grid.

Each elementary control operation acting on a trap might induce the loss of the atom it contains. We define the survival probability as $p_\alpha$, $p_v$, and $p_0$ for transfer, displacement, and no-op operations, respectively, assuming the no-op loss probability to be the same for both static and dynamic traps. We assume that control errors are limited to loss, that is, we ignore the probability of an atom being left behind in its original trap during a transfer operation. We refer to the corruption of an atom as the cumulative probability of it being lost given its control history; the corruption thus corresponds to the probability of detecting the atom using a perfect measurement.

To simplify experimental operations, prevent collisions between atoms, and ensure compatibility with typical actuating optical devices like acousto-optic deflectors, we restrict parallel control operations to linear chains of traps, corresponding to horizontal sub-rows or vertical sub-columns on the grid of the static trap array. We further restrict displacement operations to discrete elementary-step translations executed in constant time along the generator vectors of the static trap array. Greater performance might be achieved by executing parallel control operations on contiguous or non-contiguous 2D blocks of atoms, as well as displacing atoms along arbitrary trajectories at variable speed, albeit at the expense of more complex heuristics.

The reconfiguration process used to reconfigure a single column can be exact. Indeed, considering the problem of preparing a configuration of $$N_a^0$$

atoms in a chain of $N_t$ static traps, which is a special case of a tree. If the number of target traps is equal to the number of trapped atoms, i.e., $$N_a^0 = N_a^T,$$

then there is a unique assignment of trapped atoms to target traps. The number of control operations performed on traps containing atoms that is required to reach the target configuration is minimized. To reduce reconfiguration time, we apply parallel control operations to simultaneously extract, displace, and implant atoms that are not initially located in their target traps. To avoid unnecessary control errors, atoms that do not need to be displaced are not extracted into dynamic traps.

When $$N_a^0 \neq N_a^T,$$

we can still find the set of atoms that undergo the minimum number of control operations to prepare the target configuration of atoms. We do so by solving the MWPM problem on a (complete) bipartite graph G(U, V, E), where U represents the set of $$N_a^0$$

trapped atoms, V represents the set of $$N_a^T$$

target traps, and E represents the edges of the graph whose weights represent the distances between source traps containing atoms and target traps. The minimum-weight, maximum cardinality matching between target traps and source traps is solved with the Linear Assignment Problem Jonker-Volgenant special algorithm (LAPJVsp). If there is a surplus of atoms, atoms located in source traps unassigned to target traps will remain in their traps, whereas if there is a deficit of atoms, a subset of target traps will remain unpopulated.

A novel process of benchmarking reconfiguration processes, including a process of providing a suitable and intuitive computerized user interface, is presented at sections IV to VI of the appended manuscript entitled "Efficient algorithms to solve atom reconfiguration problems. I. The redistribution-reconfiguration (red-rec) algorithm".

Such a process can begin by simulating a reconfiguration process entirely on a computer, for different values of variable parameters, and storing the results of the simulations, including in particular whether the simulation has a high success probability, a low success probability, or an intermediary success probability for a given combination of values of variable parameters, in the memory of the computer. These results can then be graphically represented such as presented FIGS. 3 and 4 of the appended manuscript, which can include representing domains of high success probability in a first color or tone, domains of low success probability in a second color or tone, and domains of an intermediary success probability in yet a third color or tone. This can allow easily comparing one reconfiguration process to another and determining which one is more appropriate for the circumstances. The simulations can represent performance in a manner to closely represent experimental outcome. In some embodiments, this can help a user to determine what the limitations of a given reconfiguration process are.

The simulations can be performed on computer and involve solving a given reconfiguration problem including executing a protocol in the computer to simulate particle loss and/or noise, such as randomly sample atoms being lost, determine whether the process was successful or not, compute mean success probability for a given problem, and repeat the process for many different problems.

As seen in the examples presented, the computer-implemented process can present additional information on a display screen of a user interface, such as how many displacement operations are required to reach success or failure, number of displacement operations, number of transfer operations, number of atom moves, number of atom losses, etc.

In a particular embodiment, shaded regions can be used to represent what a system would need to enter those regions.

Using such a process, it can be easy to compare different approaches—i.e. perform process on two scenarios and compare. The process can be applied to any suitable reconfiguration algorithm. For instance, in one embodiment, this benchmarking process can be applied to red-rec reconfiguration process.

It will be noted that to be able to compare number of moves or mean success probability, one may needs a representative value of the loss parameter. This can be determined by performing experiments on the system, e.g. by measuring the loss parameter directly or indirectly (e.g. measure pressure).

Benchmarking in the absence of loss can represents a baseline success probability. In the absence of a sufficient number of traps, the process may always fail. Using the baseline success probability, a reconfiguration process can be compared to such a baseline success probability rather than being compared to another reconfiguration process.

In the embodiments presented above, or other embodiments, a thresholding process can be used to reduce mean wait time between the preparation of two successful configurations. This process can include comparing the number of particles contained in the particle traps to a threshold number of particles, and proceeding to the reconfiguration of the particles only if the number of particles is deemed to be sufficient (e.g. above the threshold number). In the event where the number of particles is deemed insufficient (e.g. below the threshold number), the initial configuration of particles in the particle traps can be reset by re-doing the loading step, until the threshold number is met, at which stage the process can proceed to reconfiguring the particles in the particle traps. In this manner, the mean wait time can be reduced by rejecting initial configurations containing less atoms than a given threshold.

The threshold can correspond to a number of target particle traps. Alternately, a threshold greater than a number of target particle traps can be set in some embodiments. Section VII of the attached manuscript provides a greater amount of detail as to how such a threshold can be set. The thresholding process can be applied independently of the nature of the reconfiguration process being used.

FIG. 5 presents an example reconfiguration protocol. In this example, the reconfiguration protocol starts by performing measurements on a given configuration of atoms. The initial configuration of atoms is obtained by adding an atom in each trap of the static trap array and equating the corruption of each atom to the loading efficiency. The collection of measurements returns a deterministic configuration of atoms. A reconfiguration problem is formulated using the measured and desired target configuration of atoms. The protocol first checks if the problem is solvable. If there are less atoms than desired, the protocol declares failure and terminates. Else, the protocol checks if the problem is already solved. If the measured configuration contains the desired configuration, the declares success and ends. Else, if the problem is solvable, but not yet solved, the protocol solves the reconfiguration problem using the specified reconfiguration algorithm. The algorithm returns a control sequence to be executed on a real or simulated system. The execution of the protocol results in atom loss. Each atom in the resulting configuration of atoms is corrupted, i.e., the j-th atom might have been lost with probability pj. Starting with a collection of measurements, the protocol then undergoes another reconfiguration cycle until it ends in failure or success.

Referring to FIG. 4 it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit. Example computers include desktop, laptop, smartphone, smart watch, less elaborated controller devices, etc.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touch-screen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. Different elements of a computer, such as processor and/or memory, can be local, or in part or in whole remote and/or distributed and/or virtual.

The methods and systems of the present disclosure may be implemented in a high level procedural or object oriented programming or scripting language, or a combination thereof, to communicate with or assist in the operation of a computer system, for example the controller. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method of FIG. 2.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

As can be understood, the examples described above and illustrated are intended to be exemplary only. The nature of the indistinguishable particles can vary depending on the embodiment, and can be one or more of atoms, ions, charges and exotic quasi-particles for instance. A particle trap can be embodied as a combination of hardware and software elements which collaborate to generate a trapping potential for a particle, i.e. which can localize a particle in space. Optical traps (e.g. atoms trapped tightly-focussed laser beams) and electromagnetic traps (e.g. charged ions trapped in electromagnetic fields generated by electrodes) are examples of particle traps. In some examples presented above, the target configuration is centered-compact, but this is not necessarily the case for all embodiments and different embodiments can have target configurations of different nature. Moreover, these processes and the formal results that underpin them can support applications in other contexts, such as robot motion planning, warehouse resource allocation, and game design. The scope is indicated by the appended claims.

What is claimed is:

1. A method of reconfiguring particles in a grid of particle traps from an initial configuration to a target configuration, the grid of particle traps having target particle traps and surplus particle traps, the particles being movable along rows of the grid, or along columns of the grid, the rows being transversal to the columns, the method comprising:

loading an initial configuration of the particles into the particle traps, wherein in said initial configuration, the particles are distributed amongst some of the particle traps;

measuring the initial configuration, including measuring an absence or presence of the particles in corresponding ones of the particle traps, the initial configuration including a donor column having more particles than target particle traps, and a receiver column having less particles than target particle traps, the donor column being separated from the receiver column by at least one intervening column;

at the donor column, filling all of the target particle traps including moving some of the particles from the surplus particle traps to the target particle traps, with a surplus particle remaining in the surplus particle traps subsequently to said moving;

moving said surplus particle to the receiver column along a corresponding one of said rows via the at least one intervening column; and at the receiver column, filling all of the target particle traps including moving some of the particles, including said at least one surplus particle, from the surplus particle traps to the target particle traps.

2. The method of claim 1 further comprising, at one or more of the intervening columns, filling all of the target particle traps including moving particles from the surplus particle traps to the target particle traps, prior to said moving said surplus particles to the receiver column.

3. The method of claim 1 wherein the donor column is a first donor column, the receiver column is a first receiver column, the surplus particle is a first surplus particle, the at least one intervening column includes at least a pair of columns including a second donor column and a second receiver column, further comprising:

at the second donor column, filling all of the target particle traps including moving some of the particles from the surplus particle traps to the target particle traps, with a second surplus particle remaining in the surplus particle traps subsequently to said moving;

moving said second surplus particle to the second receiver column along a corresponding one of said rows; and at the receiver column, filling all of the target particle traps including moving some of the particles, including said at least one second surplus particle, from the surplus particle traps to the target particle traps.

4. The method of any one of claim 3 wherein the second donor column has a plurality of said second surplus particles prior to said moving to the receiver column, and the second receiver column has a second deficit of a plurality of particles, the second deficit of a plurality of particles being equal to the plurality of second surplus particles.

5. The method of claim 1 further comprising, at the donor column, moving said surplus particle to the corresponding one of said rows, the corresponding one of said rows being free of particles in the at least one intervening column prior to said moving said surplus particle to the receiver column.

6. The method of claim 1 wherein the donor column has a plurality of surplus particles prior to said moving to the receiver column, and the receiver column has a deficit of a plurality of particles, the deficit of a plurality of particles being equal to the plurality of surplus particles.

7. The method of claim 1 including filling all target particle traps of all columns and, subsequently to said filling all target particle traps of all columns, measuring the target configuration including measuring an absence or presence of the particles in corresponding ones of the target particle traps.

8. The method of claim 7 further comprising repeating the method beginning with said loading contingent upon determining that the particles are absent from at least one of the target particle traps based on said measuring the target configuration.

9. The method of claim 8 further comprising at least one of said particles becoming lost in accordance with a first probability of loss during at least one of said moving of said at least one of said particles becoming lost.

10. The method of claim 8 further comprising at least one of said particles becoming lost in accordance with a second probability of loss during at least one of said moving of the particles other than said at least one of said particles becoming lost.

11. The method of claim 7 further comprising performing an experiment on the particles contingent upon determining that the particles are present in all of the target particle traps based on said measuring the target configuration.

12. The method of claim 1 wherein at the donor column said moving some of the particles from the surplus particle traps to the target particle traps includes simultaneously moving at least two of the particles.

13. The method of claim 1 wherein said moving said surplus particle to the receiver column includes simultaneously moving at least two of said surplus particle.

14. The method of claim 1 wherein at the receiver column, said moving some of the particles from the surplus particle traps to the target particle traps includes simultaneously moving at least two of the particles, including the surplus particle.

15. The method of claim 1 further comprising comparing a number of particles determined to be present in corresponding ones of the particle traps based on said measuring the initial configuration to a threshold number of particles.

16. The method of claim 15 wherein the threshold number of particles is equal to a number of target particle traps.

17. The method of claim 15 wherein the threshold number of particles is greater than the number of target particle traps.

18. The method of claim 1 further comprising repeating the loading to change the initial configuration contingent upon determining that the number of particles determined to be present is lower than the threshold number of particles.

19. The method of claim 1 wherein the particles are individual atoms.

20. The method of claim 1 wherein the particle traps form an array of static optical traps, and said steps of moving include picking up a particle from the array of static optical traps with an array of dynamic optical traps, moving the array of dynamic optical traps, and the array of dynamic optical traps putting the particle in the array of static optical traps.

* * * * *